United States Patent
Mikami

(10) Patent No.: US 9,165,229 B2
(45) Date of Patent: *Oct. 20, 2015

(54) PRINT CONTROL APPARATUS AND METHOD FOR PRINTING IMAGES ON A CONTINUOUS SHEET

(71) Applicant: CANON KABUSHIKI KAISHA, Tokyo (JP)

(72) Inventor: Ruriko Mikami, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/027,007

(22) Filed: Sep. 13, 2013

(65) Prior Publication Data

US 2014/0078547 A1    Mar. 20, 2014

Related U.S. Application Data

(63) Continuation of application No. 12/960,417, filed on Dec. 3, 2010, now Pat. No. 8,556,369.

(30) Foreign Application Priority Data

Feb. 26, 2010 (JP) ................. 2010-041658

(51) Int. Cl.
  *B41J 29/38* (2006.01)
  *G06K 15/00* (2006.01)
  *G03G 15/00* (2006.01)

(52) U.S. Cl.
  CPC .......... *G06K 15/4065* (2013.01); *G03G 15/502* (2013.01); *G03G 15/5029* (2013.01); *G03G 15/5095* (2013.01); *G03G 15/6517* (2013.01)

(58) Field of Classification Search
  None
  See application file for complete search history.

(56) References Cited

U.S. PATENT DOCUMENTS 5,903,362 A    5/1999    Tanaka

FOREIGN PATENT DOCUMENTS

| JP | 64-69372 A | 3/1989 |
|----|-----------|--------|
| JP | 2003-211754 A | 7/2003 |
| JP | 2004-160666 A | 6/2004 |
| JP | 2005-231154 A | 9/2005 |

*Primary Examiner* — Geoffrey Mruk
*Assistant Examiner* — Bradley Thies
(74) *Attorney, Agent, or Firm* — Canon USA Inc. IP Division

(57) ABSTRACT

A print control apparatus and method for determining a sheet size specified by a first print job and a sheet size specified by a second print job, deciding on a sheet width usable by the first print job and a sheet width usable by the second print job based on determined respective sheet sizes, deciding on a sheet width of a continuous sheet to be used by the first print job and the second print job based on the decided respective sheet widths, and printing an image based on the first print job and an image based on the second print job on a continuous sheet supplied from a sheet supplying unit that supplies a continuous sheet having the decided sheet width.

14 Claims, 13 Drawing Sheets

FIG. 3A

| PRINT-WAITING JOB LIST | PRINT JOB | | | JOB CONTROL INFORMATION | | |
|---|---|---|---|---|---|---|
| | OUTPUT SHEET SIZE | SHEET TYPE | PRINT DATA | PRINTABLE ROLL WIDTH [INCH] | PRINT ROLL WIDTH [INCH] | STATUS |
| No.1 | 4 × 6 | A | xxx.jpg ... | 6 | 6 | PRINTING PROCESSING BEING PERFORMED |
| No.2 | 6 × 8 | A | xxx.jpg ... | 6/8 | 6 | IMAGE PROCESSING BEING PERFORMED |
| No.3 | 4 × 6 | A | xxx.jpg ... | 6 | NOT YET DECIDED | RECEPTION PROCESSING BEING PERFORMED |

FIG. 3B

| PRINT-WAITING JOB LIST | PRINT JOB | | | JOB CONTROL INFORMATION | | |
|---|---|---|---|---|---|---|
| | OUTPUT SHEET SIZE | SHEET TYPE | PRINT DATA | PRINTABLE ROLL WIDTH [INCH] | PRINT ROLL WIDTH [INCH] | STATUS |
| No.1 | 10 × 12 | A | xxx.jpg ... | 12 | 12 | PRINTING PROCESSING BEING PERFORMED |
| No.2 | 6 × 8 | A | xxx.jpg ... | 6/8 | 6 | IMAGE PROCESSING BEING PERFORMED |
| No.3 | 4 × 6 | A | xxx.jpg ... | 6 | 6 | IMAGE PROCESSING BEING PERFORMED |

FIG. 3C

| PRINT-WAITING JOB LIST | PRINT JOB | | | JOB CONTROL INFORMATION | | |
|---|---|---|---|---|---|---|
| | OUTPUT SHEET SIZE | SHEET TYPE | PRINT DATA | PRINTABLE ROLL WIDTH [INCH] | PRINT ROLL WIDTH [INCH] | STATUS |
| No.1 | 10 × 12 | A | xxx.jpg ... | 12 | 12 | PRINTING PROCESSING BEING PERFORMED |
| No.2 | 6 × 8 | A | xxx.jpg ... | 6/8/12 | 12 | PRINTING PROCESSING BEING PERFORMED |
| No.3 | 4 × 6 | A | xxx.jpg ... | 5/6/8/12 | 12 | PRINTING PROCESSING BEING PERFORMED |

FIG. 8A

Do you want automatic continuous printing on the same sheet for a plurality of jobs?

| Yes | No |

FIG. 8B

Select one of the following candidates.

| Pattern 1 | Pattern 2 |
| 6 inches  A | 8 inches  A |

FIG. 8C

Which setting do you use for printing?

| Pattern 1 | Pattern 2 |
| 6 inches  A | 8 inches  A |

FIG. 9A

| PRINT-WAITING JOB LIST | PRINT JOB | | | JOB CONTROL INFORMATION | | |
|---|---|---|---|---|---|---|
| | OUTPUT SHEET SIZE | SHEET TYPE | PRINT DATA | PRINTABLE ROLL WIDTH [INCH] | PRINT ROLL WIDTH [INCH] | STATUS |
| No.1 | 4×6 | A | xxx.jpg ... | 6 | | RECEPTION PROCESSING BEING PERFORMED |
| No.2 | 6×8 | A | xxx.jpg ... | 6/8 | | RECEPTION PROCESSING BEING PERFORMED |
| No.3 | 4×6 | A | xxx.jpg ... | 6 | | RECEPTION PROCESSING BEING PERFORMED |
| No.4 | 4×6 | B | xxx.jpg ... | 6 | | RECEPTION PROCESSING BEING PERFORMED |
| No.5 | 6×12 | A | xxx.jpg ... | 6/12 | | RECEPTION PROCESSING BEING PERFORMED |
| No.6 | 5×8 | A | xxx.jpg ... | 8 | | RECEPTION PROCESSING BEING PERFORMED |
| No.7 | 4×6 | A | xxx.jpg ... | 6 | | RECEPTION PROCESSING BEING PERFORMED |
| No.8 | 6×8 | A | xxx.jpg ... | 6/8 | | RECEPTION PROCESSING BEING PERFORMED |

FIG. 9B

| PRINT-WAITING JOB LIST | PRINT JOB | | | JOB CONTROL INFORMATION | | | |
|---|---|---|---|---|---|---|---|
| | OUTPUT SHEET SIZE | SHEET TYPE | PRINT DATA | PRINTABLE ROLL WIDTH [INCH] | PRINT ROLL WIDTH [INCH] | STATUS | REQUIRED TIME (MIN) |
| No.1 | 4×⑥ | Ⓐ | xxx.jpg ... | 6 | 6 | IMAGE PROCESSING BEING PERFORMED | 3 |
| No.2 | ⑥×8 | Ⓐ | xxx.jpg ... | 6/8 | 6 | IMAGE PROCESSING BEING PERFORMED | 4 |
| No.3 | 4×⑥ | Ⓐ | xxx.jpg ... | 6 | 6 | RECEPTION PROCESSING BEING PERFORMED | 3 |
| No.4 | 4×6 | B | xxx.jpg ... | 6 | ? | RECEPTION PROCESSING BEING PERFORMED | |
| No.5 | ⑥×12 | Ⓐ | xxx.jpg ... | 6/12 | 6 | RECEPTION PROCESSING BEING PERFORMED | 5 |
| No.6 | 5×8 | A | xxx.jpg ... | 8 | 6 | RECEPTION PROCESSING BEING PERFORMED | |
| No.7 | 4×⑥ | Ⓐ | xxx.jpg ... | 6 | 6 | RECEPTION PROCESSING BEING PERFORMED | 5 |
| No.8 | ⑥×8 | Ⓐ | xxx.jpg ... | 6/8 | 6 | RECEPTION PROCESSING BEING PERFORMED | 7 |

FIG. 9C

| PRINT-WAITING JOB LIST | PRINT JOB | | | JOB CONTROL INFORMATION | | | |
|---|---|---|---|---|---|---|---|
| | OUTPUT SHEET SIZE | SHEET TYPE | PRINT DATA | PRINTING-ALLOWED ROLL WIDTH [INCH] | PRINT ROLL WIDTH [INCH] | STATUS | REQUIRED TIME (MIN) |
| No.1 | 4 × 6 | A | xxx.jpg ... | 6 | 6 | PRINTING PROCESSING BEING PERFORMED | |
| No.2 | 6 × 8 | A | xxx.jpg ... | 6/8 | 6 | IMAGE PROCESSING BEING PERFORMED | 2 |
| No.3 | 4 × 6 | A | xxx.jpg ... | 6 | ? | RECEPTION PROCESSING BEING PERFORMED | |
| No.4 | 4 × 6 | B | xxx.jpg ... | 6 | ? | RECEPTION PROCESSING BEING PERFORMED | |
| No.5 | 6 × 12 | A | xxx.jpg ... | 6/12 | ? | RECEPTION PROCESSING BEING PERFORMED | |
| No.6 | 5 × 8 | A | xxx.jpg ... | 8 | ? | RECEPTION PROCESSING BEING PERFORMED | 3 |
| No.7 | 4 × 6 | A | xxx.jpg ... | 6 | ? | RECEPTION PROCESSING BEING PERFORMED | |
| No.8 | 6 × 8 | A | xxx.jpg ... | 6/8 | ? | RECEPTION PROCESSING BEING PERFORMED | 5 |

FIG. 11A

| COMBINATION PATTERN | RECOMMENDATION (NUMBER OF JOBS) | RECOMMENDATION (TIME) |
|---|---|---|
| PATTERN 1 (6 INCHES　SHEET TYPE A ~) | 1 (6) | 2 (36 MIN) |
| PATTERN 2 (8 INCHES　SHEET TYPE A ~) | 2 (3) | 1 (28 MIN) |
| PATTERN 3 (6 INCHES　SHEET TYPE B ~) | 3 (1) | 3 (40 MIN) |

FIG. 11B

| | 1ST | 2ND | 3RD | TOTAL (MIN) |
|---|---|---|---|---|
| PATTERN 1 | 6 INCHES SHEET A | 8 INCHES SHEET A | 6 INCHES SHEET B | |
| | 27 | 4 | 5 | 36 |
| PATTERN 2 | 8 INCHES SHEET A | 6 INCHES SHEET A | 6 INCHES SHEET B | |
| | 10 | 13 | 5 | 28 |

PRINT CONTROL APPARATUS AND METHOD FOR PRINTING IMAGES ON A CONTINUOUS SHEET

CROSS REFERENCE TO RELATED APPLICATIONS

The present application is a Continuation of U.S. patent application Ser. No. 12/960,417 filed Dec. 3, 2010, which claims priority from Japanese Patent Application No. 2010-041658 filed Feb. 26, 2010, each of which is hereby incorporated by reference herein in their entirety.

BACKGROUND OF THE INVENTION

1. Field of the Invention

The present invention generally relates to print control and, more particularly, to print control apparatuses and methods for printing images on a continuous sheet, such as roll paper.

2. Description of the Related Art

Hitherto, when images are printed on a continuous sheet such as roll paper, after printing based on one job has been performed, the continuous sheet is cut, and the remaining continuous sheet is rewound. When the next printing job is to be performed, the rewound continuous sheet is conveyed to a printing position again and printing is performed (refer to Japanese Patent Laid-Open No. 2003-211754).

In the case in which such a procedure is used to perform printing, whenever a print job is received for which a sheet of a size different from the prior one is to be used, it is necessary to cut and exchange the sheet, causing the time for completing a plurality of jobs to become long.

SUMMARY OF THE INVENTION

An aspect of the present invention provides an apparatus and method for print control in which the above-described problem has been solved. Another aspect of the present invention provides an apparatus and method for print control that realize efficient execution of a plurality of print jobs that specify different sheet sizes when printing is performed on a continuous sheet.

Further features of the present invention will become apparent from the following description of exemplary embodiments with reference to the attached drawings.

BRIEF DESCRIPTION OF THE DRAWINGS

FIGS. 3A to 3C illustrate exemplary print-waiting job lists according to an exemplary embodiment of the present invention.

FIGS. 8A to 8C illustrate exemplary display screens presented to a user according to an exemplary embodiment of the present invention.

FIGS. 9A to 9C illustrate exemplary presentations of print-waiting job lists according to an exemplary embodiment of the present invention.

FIGS. 11A and 11B illustrate recommended patterns according to an exemplary embodiment of the present invention.

DESCRIPTION OF THE EMBODIMENTS

Hereinafter, embodiments of the present invention are described with reference to the attached drawings. Note that the relative arrangement of the components of apparatuses and the shapes of the apparatuses in the embodiments are only examples, and the embodiments are not limited to these examples.

Figure 1:
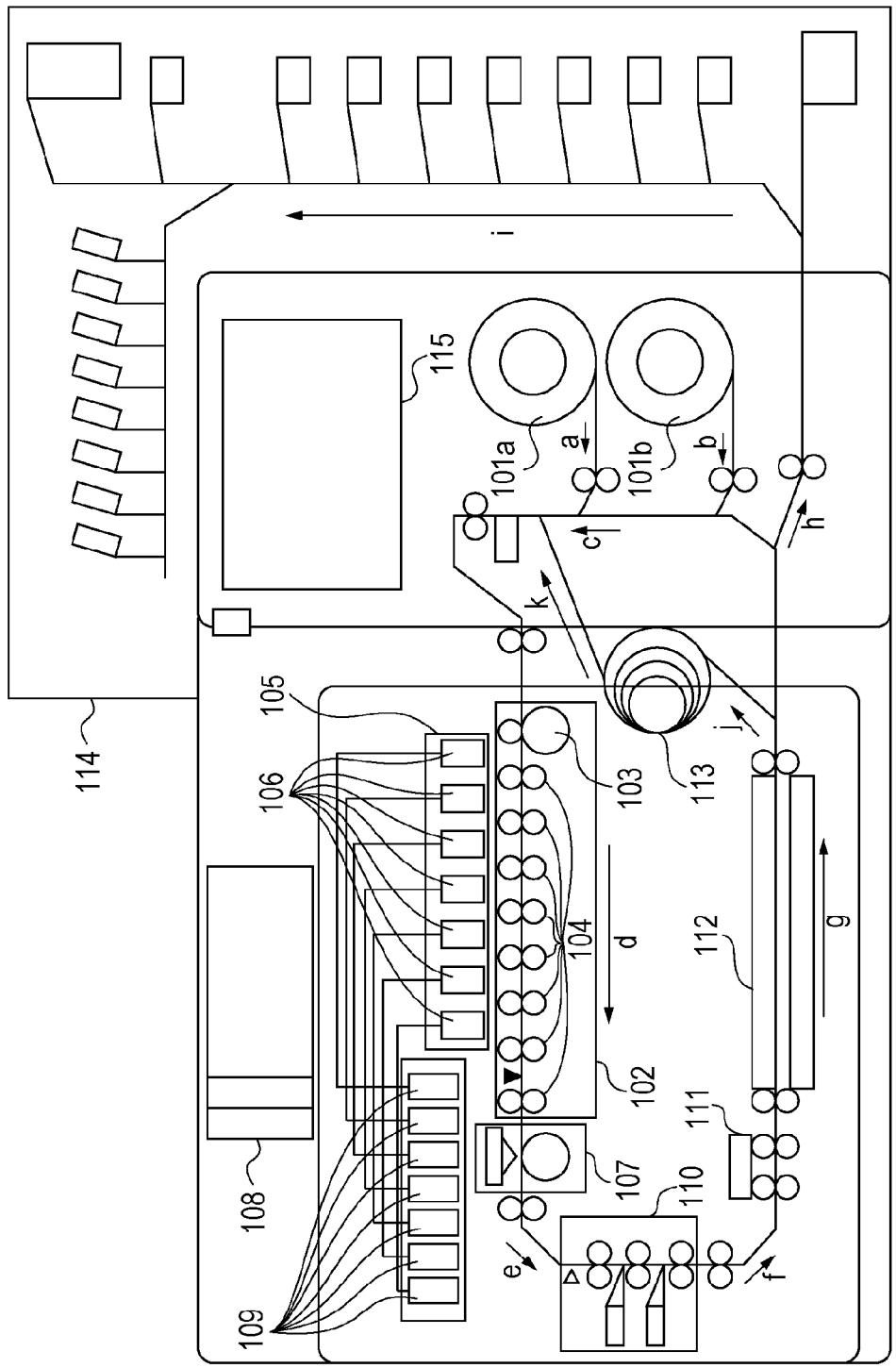
FIG. 1 illustrates a schematic configuration of an image forming apparatus which is an exemplary embodiment of the present invention.

FIG. 1 illustrates a schematic configuration of an image forming apparatus, which is an example of a print control apparatus in the present embodiment. The image forming apparatus illustrated in FIG. 1 is an example that includes only a print function which prints data received from an external apparatus, but not limited to this, the image forming apparatus may be an apparatus functioning as a copier that also includes a reading unit for reading images of documents or may be an apparatus functioning as a multifunctional apparatus that includes additional functions.

Description is made of an example in which a roll sheet is used as a recording material (medium on which to record or recording sheet). This roll sheet is an example of a continuous sheet, but a continuous sheet other than a rolled one may also be used. Regarding cutting of a continuous sheet, the continuous sheet may be automatically cut by the image forming apparatus or may be cut in accordance with an instruction given by a user. The types of recording material that can be used are not limited to paper but may be various materials on which recording can be performed. In addition, the image forming apparatus may be an apparatus that can print an image not only on a continuous sheet but also on a cut sheet which has been cut in a predetermined size in advance.

The printing method is not limited to inkjet image printing using image printing liquid ink described later. Solid ink may be used as a recording agent applied to a recording material. Various methods may be used such as electrophotographic printing using toner, dye sublimation printing, thermal transfer printing, and dot impact printing. In addition, monochrome recording using only a black color (including gray scale) may be used, not limited to color recording using a plurality of recording agents. Further, not limited to visible images, invisible or hardly visible images may be printed. Not limited to general images, printed images may be wiring patterns, physical patterns for the manufacture of components, a base arrangement of DNA. In addition, the present embodiment can be applied to various types of recording apparatus in which recording agents can be applied to recording materials. Further, in the case in which the operation of the image forming apparatus illustrated in FIG. 1 is controlled by instructions from an externally connected apparatus, the external apparatus functions as the print control apparatus.

FIG. 1 is a sectional view illustrating a schematic configuration of an image forming apparatus in which a roll sheet (continuous sheet longer than a unit of printing (page) in a conveying direction) is used as a recording material. The image forming apparatus includes components 101 to 115 described below, which are arranged in a casing. However, these components may be divided and arranged in a plurality of casings.

A control unit 108 houses a control section that includes a controller (including a central processing unit (CPU), a micro-processing unit (MPU), and/or the like), an output unit (display or sound information generator) for outputting user interface information, and various input/output (I/O) interfaces, and performs various types of control of the whole image forming apparatus.

Two sheet cassettes, i.e., an upper sheet cassette 101a and lower sheet cassette 101b are provided as units for holding and supplying a roll sheet (also called sheet supplying units). A user mounts a roll sheet (hereinafter called a sheet) in the image forming apparatus after putting the sheet in a magazine. A sheet drawn out of the upper sheet cassette 101a and a sheet drawn out of the lower sheet cassette 101b are respectively conveyed in a direction a and a direction b in the figure. The sheet from either of the cassettes is conveyed in a direction c and reaches a conveyer unit 102. The conveyer unit 102 conveys the sheet in a direction d (horizontal direction) using a plurality of rotating rollers 104 during print processing. When the sheet cassette supplying the sheet is changed from the current one to the other one, the already drawn out sheet is rewound into the cassette, and a sheet to be newly supplied is supplied from a cassette in which the sheet is set. Note that the present image forming apparatus allows roll sheets having widths of 5 inches, 6 inches, 8 inches, and 12 inches to be set in the cassettes 101a and 101b.

A head unit 105 is arranged above the conveyer unit 102 in such a manner as to face the conveyer unit 102. The head unit 105 holds independent print heads 106 corresponding to a plurality of colors (seven colors in the present embodiment) arranged along the sheet conveying direction. The present embodiment includes seven print heads, corresponding to cyan (C), magenta (M), yellow (Y), light cyan (LC), light magenta (LM), gray (G), and black (K). Of course, colors other than these colors may be used, and it is not necessary to use all of these colors together.

In the image forming apparatus, an image is formed on a sheet by ejecting ink from the print heads 106 in synchronization with the movement of the sheet conveyed by the conveyer unit 102. Note that the print heads 106 are arranged such that positions to which ink is ejected do not overlap the rotating rollers 104. Instead of directly ejecting ink to the sheet, ink may be first applied to an intermediate medium and then to the sheet, to form an image. The conveyer unit 102, the head unit 105, and the print heads 106 form a unit for printing of the present embodiment.

Ink tanks 109 independently store ink having respective colors. The ink is supplied from the ink tanks, through tubes, 109 to sub tanks provided for respective colors, from where the ink is supplied to the print heads 106 through tubes.

Regarding the print heads 106, line heads having respective colors (seven colors in the present embodiment) are arranged along the conveying direction d at the time of printing. Each line head may be formed of a single seamless nozzle chip, or may be a head in which separate nozzle chips are regularly arranged in a line or staggered array. The head used in the present embodiment has a full multi-head structure which has nozzles arranged so as to cover the full width of the printed range of a sheet which has the maximum allowable size in the present apparatus. In inkjet printing in which ink is ejected from nozzles, a method using thermal devices, a method using piezoelectric devices, a method using electrostatic devices, a method using MEMS devices, and the like may be employed. The timing of ejecting ink from each nozzle in accordance with print data is determined by an output signal from a conveyance encoder 103.

After an image has been formed on a sheet, the sheet is conveyed from the conveyer unit 102 to a scanner unit 107. In the scanner unit 107, it is determined whether or not a printed image has a problem, and the states of the apparatus including the state of ink injection is checked, by optically reading the printed image or a special pattern on the sheet. Example methods of checking the printed image include a method of checking the ink ejection state by reading a pattern for checking the state of the heads, or a method of determining whether or not the printing has been performed successfully by comparing the printed image with the original image. The method of checking or determination can be appropriately selected from various methods.

The sheet is conveyed from the vicinity of the scanner unit 107, in a direction e, into a cutter unit 110. In the cutter unit 110, the sheet is cut in units of predetermined unit lengths of printing. The predetermined unit length of printing changes in accordance with the size of a printed image. For example, the length in the conveying direction is 135 mm for an L-size photograph and 297 mm for A4 size. The cutter unit 110 cuts the sheet in units of pages for simplex printing, but may not cut the sheet in units of pages, depending on the content of a print job. In the case of duplex printing, the cutter unit 110 does not cut the sheet after printing on the first surface (surface on which images are printed first, i.e., front surface, for example) in units of pages, and images are continued to be printed up to a predetermined length, and after images have been printed on the second surface (surface on which images are printed later, i.e., back surface, for example), the cutter unit 110 cuts the sheet in units of pages. Note that the cutter unit 110 does not necessarily cut the sheet for every image page in simplex printing or in printing on the back surface in duplex printing. Without cutting the sheet before the sheet is conveyed a predetermined distance, the sheet may be cut after the sheet has been conveyed the predetermined distance, and a separate cutter apparatus may cut the sheet into units of image pages in accordance with an instruction given through a manual operation, for example. Regarding the width of the sheet, when the sheet needs to be cut in the width direction thereof, a separate cutter apparatus is used to cut the sheet.

The sheets conveyed from the cutter unit 110 are conveyed in a direction f in the figure to a back-surface information printing unit 111. The back-surface information printing unit 111 prints predetermined information on the back surface of the sheet in the case in which an image is printed only on one surface of the sheet. Examples of information printed on the back surface of the sheet include information (order management number, for example) such as characters, symbols, codes corresponding to each printed image. In the case in which the print heads 106 print images corresponding to a print job for duplex printing, the back-surface information printing unit 111 prints the information described above in an area other than the area that includes images printed by the print heads 106. The back-surface information printing unit 111 may employ a method of affixing a recording agent, thermal transfer printing, or inkjet printing.

The sheets that passed through the back-surface information printing unit 111 are conveyed to a dryer unit 112. The dryer unit 112 applies heat to the sheets passing therethrough in a direction g in the figure using warm air (heated gas (air))

to dry the ink applied sheets in a short time. Note that exemplary various methods which can be employed for drying the sheets other than that using warm air include cold air, heating with a heater, air drying through simply leaving the sheets to stand, irradiation with electromagnetic waves such as ultraviolet light. The sheets cut in units of unit lengths of printing pass through the dryer unit 112 one by one, and are conveyed in a direction h in the figure to a sorting unit 114.

The sorting unit 114, which has a plurality of trays (18 trays in the present embodiment), selects trays to which the sheets are discharged in accordance with the unit lengths of printing. Each tray has a tray number assigned thereto. The sorting unit 114 discharges the sheets passing therethrough in a direction i in the figure into a tray corresponding to the tray number set for each printed image, while checking the state of the tray so as to determine whether or not the tray is vacant or full of sheets, using a sensor provided on each of the trays. The tray to which the cut sheet is to be discharged may be a tray specified by the source (host apparatus) that issued the print job or a vacant tray that is appropriately specified by the image forming apparatus side. A predetermined number of sheets can be discharged to one tray. In the case of a print job that prints more than this predetermined number of sheets, the sheets are discharged to a plurality of the trays. The number, size, and kind of sheets that can be discharged to a tray change in accordance with the size (type) or the like of the tray. In FIG. 1, both large sheets (larger than the L size, such as A4 size) and small sheets (L size) can be discharged to a group of trays (hereinafter called large trays) arranged vertically (up-down direction). Small sheets (L size) can be discharged to a group of trays (hereinafter called small trays) arranged horizontally (left-right direction), but large sheets cannot be discharged to the small trays. The number of output sheets which can be discharged to the large trays is larger than that of the small trays.

States such as "sheets are being discharged" and "discharging completed" are displayed using display devices (LEDs, for example), thereby allowing a user to know the states. For instance, by providing a plurality of LEDs emitting different colors for each tray, a user can be notified of the various states of each tray in accordance with the color of an illuminating LED or whether the LED is illuminating or blinking. Priority levels may be assigned to respective trays, whereby the image forming apparatus, for execution of print jobs, allocates vacant trays (with no sheets) in descending order of the priority levels, as trays to which sheets are to be discharged. In a default configuration, an upper tray has a higher priority level among the large trays, and a tray closer to the left side has a higher priority among the small trays. The small trays have higher priority levels than the large trays. The priority levels may be set such that trays at locations easily accessible by the user have high priority levels. The priority levels may be appropriately changed by a user operation.

A sheet winding unit 113 winds a sheet whose front surface has images printed thereon and which has not been cut in units of pages. In the case of duplex printing, a sheet having images formed first on the front surface thereof, is not cut in units of pages by the cutter unit 110, and after the continuous printing on the front surface has been finished, the sheet is cut. The sheet having images printed on the front surface thereof, passes through the units in a direction j in the figure, and wound by the sheet winding unit 113. The wound sheet, with images having been formed on a sequence of pages thereof, is conveyed again through the unit in a direction k in the figure such that the back surface, which is opposite the previous front surface, is set as a surface on which printing can be performed, that is, the surface that faces the print heads 106 has been reversed. At this time, the sheet winding unit 113 is rotated in a direction opposite to that at the time of winding, whereby the sheet is conveyed with the cut edge at the front. By conveying the sheet in this manner, images for the back surface, opposite the front surface, of the sheet are printed. In the case of usual simplex printing, the sheets on which images have been printed are conveyed to the sorting unit 114 without being wound by the sheet winding unit 113.

Since the sheet is wound using the sheet winding unit 113 and printing is performed on the back surface by reversing the sheet in the case of duplex printing, as described above, the surface of the sheet at the discharging of the sheet to the sorting unit 114 is reversed in the case of duplex printing compared with the case of simplex printing. In other words, in the case of simplex printing, since the sheet is not reversed using the sheet winding unit 113, the sheet on which the image of the first page is printed is discharged in a state in which the image of the first page is facing downward. In the case in which a print job prints a plurality of pages, the sheet of the first page is first discharged to a tray, and then, subsequent pages are discharged sequentially and piled up. Such discharging is called face down discharging. On the other hand, in the case of duplex printing, since the sheet is reversed using the sheet winding unit 113, the sheet on which the image of the first page is printed is discharged in a state in which the image of the first page is facing upward. In the case in which a print job prints a plurality of pages, the sheet including the last page is first discharged to a tray, and then, sheets of pages are discharged sequentially in reverse order and piled up, and finally, the sheet having the image of the first page printed thereon is discharged. Such discharging is called face up discharging. Note that the order in which the first surface is printed (descending order or ascending order) may be changed in accordance with simplex printing or duplex printing to make the respective surfaces of the sheets, at the time of discharging, in simplex printing and duplex printing the same (always face up or face down).

An operation unit 115 allows a user to perform various operations and to be notified of various kinds of information. The operation unit 115 includes hardware keys and a touch panel allowing a user to perform various operations and a display for notifying the user of various kinds of information. Presentation of information to a user may be performed by outputting sounds (such as a buzzer and voice) based on sound information generated by a sound generator. The operation unit 115 allows a user to check the state of printing corresponding to each order number, indicating, for example, which tray holds a sheet having the user-specified image printed thereon or whether the image is being printed or has been printed. In addition, the operation unit 115 allows a user to check the various states of the apparatus, such as ink levels and the remaining amounts of sheet, and to instruct the apparatus to perform maintenance, such as head cleaning, through operation of the operation unit 115. Further, the size (roll width), length, and type (quality or material of a sheet, such as plain paper, glossy paper, coated paper, or a film) of the sheet set in each of the sheet cassettes 101a and 101b can be registered in an internal memory through the operation unit 115.

Figure 2:
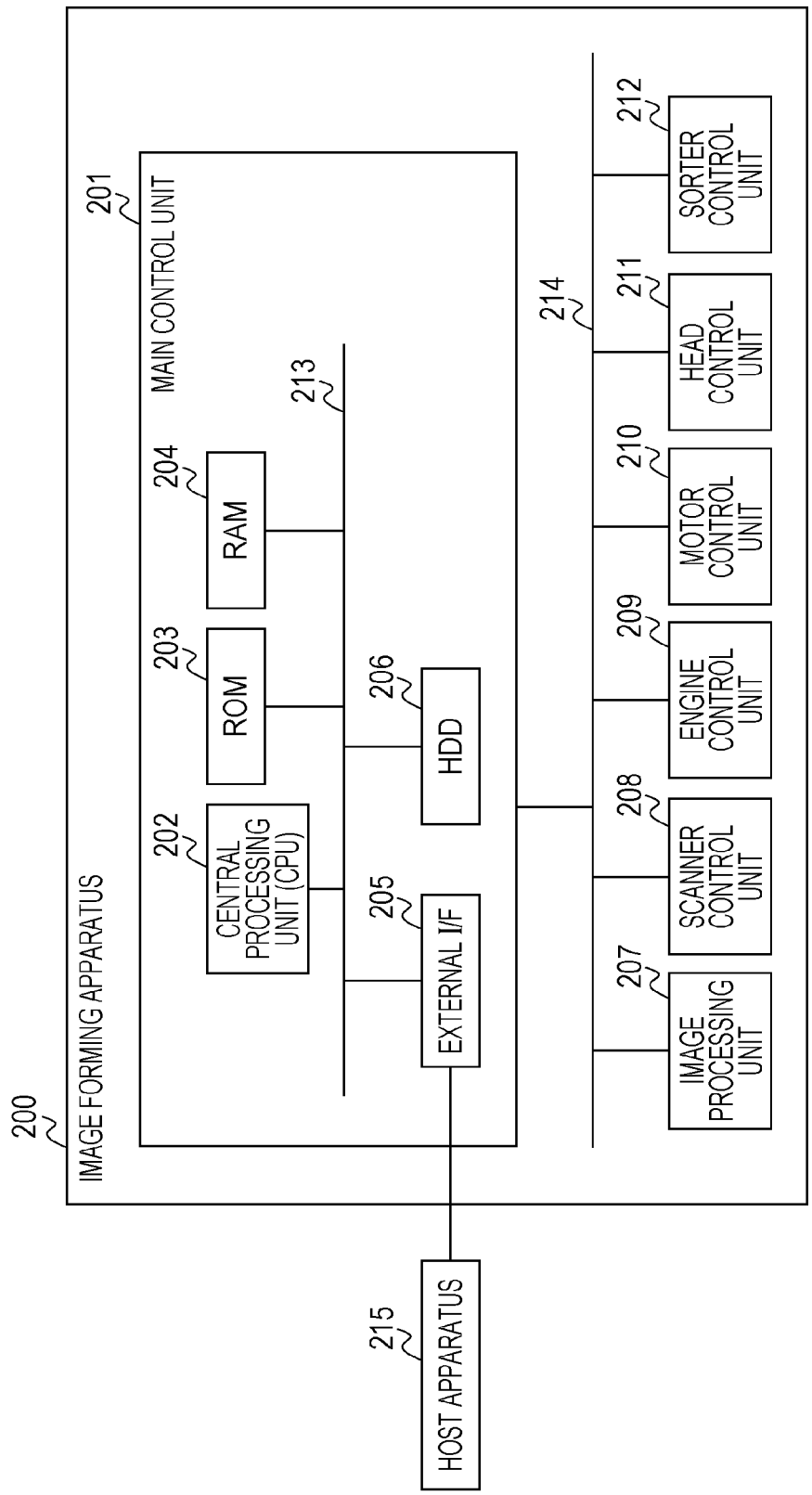
FIG. 2 is a block diagram illustrating a configuration related to the control of the image forming apparatus illustrated in FIG. 1.

FIG. 2 is a block diagram for illustrating a configuration related to the control of the image forming apparatus illustrated in FIG. 1. An image forming apparatus 200 is the image forming apparatus illustrated in FIG. 1. The configuration described below is only an example, and various modifications are possible.

The control unit 108 mainly includes a main control unit 201, an image processing unit 207, a scanner control unit 208, an engine control unit 209, a motor control unit 210, a head control unit 211, and a sorter control unit 212 illustrated in FIG. 2. These components can communicate with one another via a system bus 214.

The main control unit 201 includes a central processing unit (CPU) 202, a read-only memory (ROM) 203, a random access memory (RAM) 204, an external interface (I/F) 205, and a hard disk drive (HDD) 206. These components can communicate with one another via a system bus 213. The main control unit 201 controls the entire image forming apparatus 200.

The CPU 202 is a microprocessor (microcomputer) based central processing unit, controls the operation of the whole image forming apparatus 200 by executing programs and activating hardware. The ROM 203 stores the programs executed by the CPU 202 and fixed data necessary for various operations of the image forming apparatus 200. The RAM 204 is used by the CPU 202 as a work area and a temporary storage area for various received data, and to store various setting data. The external I/F 205 is used to connect external apparatuses to the image forming apparatus 200. The external I/F 205 may by a local I/F or a network I/F. The external I/F 205 may provide wired connection or wireless connection. The HDD 206 stores and reads programs executed by the CPU 202, print data, setting information necessary for the various operations of the image forming apparatus 200. Note that the HDD 206 may be replaced with another large capacity storage apparatus.

The image processing unit 207 performs various kinds of image processing including development (conversion) of print data (data and image files represented by a page description language, for example) processed by the image forming apparatus 200 into image data (bitmap image). The image processing unit 207 also converts a color space (YCbCr, for example) included in input print data to a standard RGB color space (sRGB, for example). In addition, the image processing unit 207 performs various kinds of image processing for the image data, such as image resolution conversion to an appropriate number of pixels allowed by the print processing performed by the image forming apparatus 200, image analysis, and image correction as required. The image data obtained by the image processing described above is stored in an internal RAM, the RAM 204, or the HDD 206. Note that, similarly to the main control unit 201, the image processing unit 207 also includes a CPU, a ROM, and a RAM connected to one another via a system bus, and the CPU performs the above-described image processing, in accordance with programs stored in the ROM.

The scanner control unit 208, by controlling an image sensor in accordance with control commands received from the CPU 202 or the like, reads an image on a sheet, obtains analog brightness data for red (R), green (G), and blue (B) colors, and converts the data to digital data. Examples of the image sensor which can be employed include a CCD image sensor and a CMOS image sensor. The image sensor may be a linear image sensor or an area image sensor. The scanner control unit 208 instructs driving of the image sensor, obtains the state of the image sensor which has been driven, analyzes brightness data obtained by the image sensor, and detects no ejection of ink from the print heads 106 or the cutting positions of a sheet. A sheet which has been determined by the scanner control unit 208 to have an image correctly printed thereon is discharged to a specified tray of the sorting unit 114, after being subjected to drying processing of the ink on the sheet. Note that, similarly to the main control unit 201, the scanner control unit 208 also includes a CPU, a ROM, and a RAM connected to one another via a system bus, and the CPU performs the image capturing processing described above, in accordance with programs stored in the ROM.

The engine control unit 209 controls the processing for printing an image, based on print data, on a sheet in accordance with control commands received from the CPU 202 or the like. The engine control unit 209, at the time of printing processing, controls the head control unit 211, the motor control unit 210, the scanner control unit 208, and the sorter control unit 212, whereby a series of printing processing is performed. In other words, under the control of the engine control unit 209, ink is applied to a sheet using the print heads 106, sheets are conveyed, it is determined whether or not printing has been successful by using the image sensor, and sorting is performed using the trays of the sorting unit 114. Control commands, various data, status signals, and the like are received from and sent to the main control unit 201 through the system bus 214. Note that, similarly to the main control unit 201, the engine control unit 209 also includes a CPU, a ROM, and a RAM connected to one another via a system bus, and the CPU controls the above-described printing processing, in accordance with programs stored in the ROM.

The motor control unit 210 instructs driving of a drawing roller for drawing a sheet out of the cassette and driving of a conveying roller for conveying the drawn out sheet, and controls the motors for driving the rollers in accordance with control commands received from the engine control unit 209. By obtaining information about the state of the rotation of the conveying rollers and the like, the motor control unit 210 makes a sheet be conveyed at an appropriate speed along an appropriate path or stop, and measures a length by which the sheet has been conveyed. Note that, similarly to the main control unit 201, the motor control unit 210 also includes a CPU, a ROM, and a RAM connected to one another via a system bus, and the CPU performs the above-described processing related to motor control, in accordance with programs stored in the ROM.

The head control unit 211 instructs the print heads 106 for respective colors to eject ink and sets ejection timings for adjusting the positions of dots on a recording material (ink applied positions), and performs adjustment and the like by obtaining information about the states of the heads being driven. In accordance with control commands received from the engine control unit 209, the head control unit 211 controls driving of the print heads 106 in accordance with print data, makes the print heads 106 eject ink, and thereby makes an image be formed on a sheet. Note that, similarly to the main control unit 201, the head control unit 211 also includes a CPU, a ROM, and a RAM connected to one another via a system bus, and the CPU controls the above-described processing using the print heads 106, in accordance with programs stored in the ROM.

The sorter control unit 212 controls instruction regarding a conveying path of a sheet, switching of a tray, and the like, in accordance with control commands received from the engine control unit 209 to discharge sheets to the trays of the sorting unit 114. In addition, the sorter control unit 212 can detect whether or not a sheet exists on each tray on the basis of the output from the sheet detection sensor of each tray. Note that, similarly to the main control unit 201, the sorter control unit 212 also includes a CPU, a ROM, and a RAM connected to one another via a system bus, and the CPU controls the above-described processing using the sorting unit 114, in accordance with programs stored in the ROM.

A host apparatus 215, which corresponds to the external apparatus described above, is externally connected to the image forming apparatus 200. The host apparatus 215 is a supply source of image data for making the image forming apparatus 200 perform printing, and issues orders for various print jobs.

The host apparatus 215 may be realized by a general purpose personal computer (PC) or by other types of data supplying apparatus, such as an image capturing apparatus, which captures images and generates image data. Such image capturing apparatuses include, for example, a reader (scanner) that scans images on a document and generates image data and a film scanner that scans a negative film or positive film and generates image data. Other examples include a digital camera that shoots a still image and generates digital image data, and a digital video camera that picks up a movie and generates movie data. Further, by providing a photo storage system in the network or by providing a memory slot for inserting a removable memory device to the image forming apparatus, image files stored in the photo storage system or the removable memory device may be read and printed, through generation of image data. In addition, instead of a general purpose PC, various types of data supply apparatus such as a special purpose terminal for the image forming apparatus may be used. Such a data supply apparatus may be a component of the image forming apparatus or may be externally connected to the image forming apparatus. In the case in which the host apparatus 215 is a PC, the operating system (OS), application software for generating image data, and the printer driver for the image forming apparatus 200 are installed in the memory of the PC. The printer driver controls the image forming apparatus 200 and generates print data by converting image data provided by an application software program to the data form that can be processed by the image forming apparatus 200. Print data may be converted to image data on the host apparatus 215 side and provided to the image forming apparatus 200. Note that all of the processing described above need not be implemented in software, and part or the whole of the processing may be implemented in hardware, such as application specific integrated circuits (ASICs). Image data provided from the host apparatus 215, commands, status signals, and the like can be transmitted to or received from the image forming apparatus 200 through the external I/F 205.

In the examples described above, it has been assumed that the functional blocks include respective CPUs. However, not limited to this, a configuration is possible in which some of the functional blocks, which do not include respective CPUs, operate under the control of the main control unit 201 and/or the engine control unit 209. Further, each of the functional blocks illustrated in FIG. 2 may be divided into appropriate processing units or control units or may be combined, differently from the current functional divisions, thereby allowing various configurations to be used. Note that a direct memory access controller (DMAC) may also be used to read data from a memory.

The flow of processing performed by the image forming apparatus 200 to execute a print job will now be described. The image forming apparatus 200, when receiving a print job, creates a print-waiting job list, as illustrated in FIGS. 3A to 3B, in the HDD 206. A print job includes information about an output sheet size indicating the size of a sheet subsequent to cutting of the sheet, a sheet type indicating the quality of the sheet, a printing mode (simplex printing, duplex printing, bookbinding printing, etc.) in addition to print data (file).

Job numbers in order of reception (i.e., job numbers in accordance with the order in which jobs are received) are assigned to respective print jobs registered in the print-waiting job list. Also when the external I/F 205 is a network I/F and print jobs are received from a plurality of host apparatuses that exist in the network, job numbers in order of reception are assigned. For each of the print jobs, an output sheet size (width×length (inch)), a sheet type, and a file name (specified by a user who issued the job) for identifying print data, specified by the received print job, are recorded. As job control information, roll widths for which printing is possible (printable roll widths) are decided upon on the basis of the output sheet size specified by a print job, and the decided roll widths are recorded. When a roll width to be actually used is decided upon from among the printable roll widths, the roll width is recorded as a print roll width. Further, the status of each print job is recorded, and updated whenever it changes.

In the example illustrated in FIG. 3A, for example, the record for the first print job shows that, the output sheet size is "4 inches×6 inches", the sheet type is "A", and the file name of print data is "xxx.jpg". It is also shown that the decided printable roll width is "6 inches", "6 inches" has been set as the print roll width, and "print processing is being performed" for the job by the engine control unit 209. The record for the second job shows that there are two of the printable roll widths, "6 inches" and "8 inches", "6 inches" has been set as the print roll width, and "image processing is being performed" for the job by the image processing unit 207. The record for the third job shows that the job is in a state of having been received by the main control unit 201, and the print roll width has not yet been decided.

Figure 4:
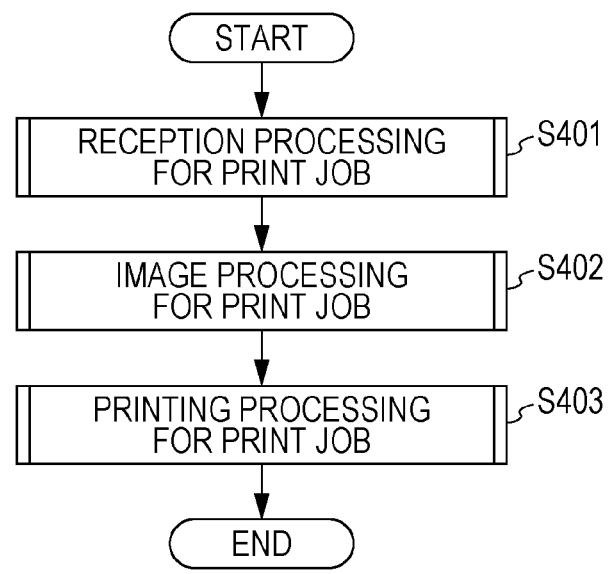
FIG. 4 is a flowchart illustrating a flow of processing according to an exemplary embodiment of the present invention.

FIG. 4 is a flowchart illustrating a flow of processing performed by the image forming apparatus 200 when a print job is received and executed. The flowchart illustrates the flow of processing performed by the respective CPUs of the functional blocks illustrated in FIG. 2 as a result of the CPUs loading control programs stored in the ROMs or the HDD 206 into the RAMs and executing the programs. Overall control of the whole processing is performed by the CPU 202. It is assumed that the size (roll width) and type of the sheet set in each of the cassettes 101a and 101b have been registered in the RAM 204 or the RAM of the engine control unit 209 through operation of the operation unit 115 by a user.

In step S401, when a print job is received through the external I/F 205, the CPU 202 starts processing for this print job. The received print job is first stored in the HDD 206, and various settings for executing the print job are set.

Figure 5:
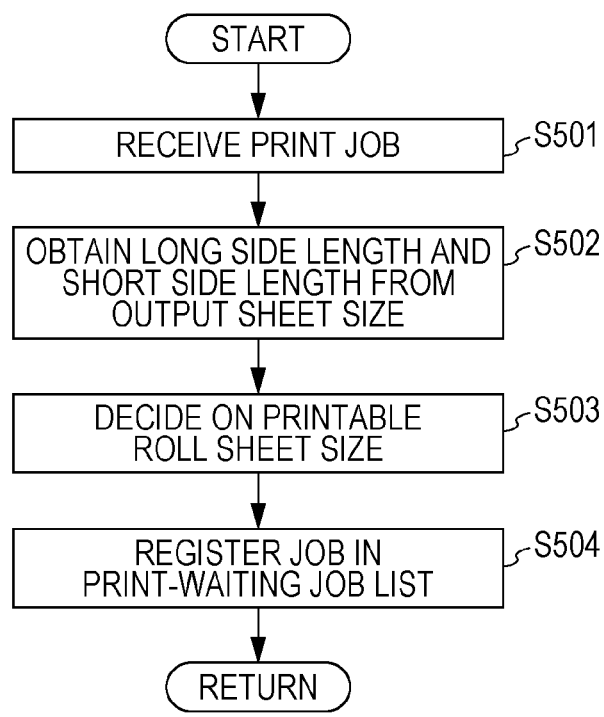
FIG. 5 is a flowchart illustrating a flow of reception processing for a print job according to an exemplary embodiment of the present invention.

FIG. 5 is a flowchart illustrating the details of the processing of step S401. This flowchart illustrates the flow of processing that the CPU 202 performs by loading control programs stored in the ROM 203 or the HDD 206 into the RAM 204 and executing the programs.

When the print job is received in step S501, the job is stored in the HDD 206. In step S502, information about the output sheet size included in the received job (specified by the print job) is read and the long length (long side length) and the short length (short side length) among the width and length (horizontal and vertical) are obtained. The sheet size may be determined on the basis of the sheet size stored in the print job as is, or may be determined on the basis of calculation through the measurement of the size of print data in the print job.

Then in step S503, a printable roll width is decided upon. Here, it is first determined whether or not each of the short side length and long side length obtained in step S502 can be used in the image forming apparatus 200. When it is determined that the length can be used, the length determined to be usable is made to be a printable roll width.

The image forming apparatus 200 allows a roll sheet having a width larger than the long side length or the short side length to be used for printing. Hence, a length that is different from the long side length and short side length may be made to be a printable roll width. To do this, information about whether or not printing on a sheet having a width larger than that of the output sheet is "permitted" or "not permitted" is registered in the RAM 204 in advance through operation of the operation unit 115. In the case in which "permitted" has been registered, a width, which is allowed to be used in the image forming apparatus 200, larger than the width of the output sheet is also made to be a printable roll width. Here, a "larger width" is a length in the width direction at the time of printing an image, and refers to a width larger than the length in the width direction of the output sheet, at the time of printing the image, which may be the width or length of the output sheet. In other words, through rotating processing of the image, a length in the longitudinal direction of the output sheet may become the length in the width direction.

In addition, in the case in which "permitted" has been registered, it may be further determined whether or not the larger width is made to be a printable roll width in accordance with the print mode of the print job. In the case in which bookbinding printing is specified as the print mode, the image forming apparatus 200 performs printing with the page order in accordance with the content of bookbinding printing, but bookbinding such as pasting itself is not performed. Hence, in the case in which bookbinding has been specified, after the image forming apparatus 200 has discharged sheets to be bound into a book, the sheets are bound into a book by a bookbinding machine provided separately from the image forming apparatus 200. The sheets are cut in this bookbinding machine. Accordingly, in the case in which "permitted" has been registered and the printing mode is bookbinding, a width larger than that of the output sheet is added as one of the printable roll widths. This makes an object printed on a sheet having a width larger than that of the output sheet be an object to be bound into a book later, resulting in higher efficiency. However, by providing a bookbinding function within the image forming apparatus 200, the image forming apparatus 200 may be made to automatically perform bookbinding processing, such as sheet width/length cutting and pasting.

When a width larger than that of the output sheet is selected as the printable roll width, a width which makes a smaller margin may be selected in accordance with the amount of a margin. Here, a margin in the width direction may be determined on the basis of a difference between the width of the output sheet and a roll width, and a margin generated at the trailing end of a roll sheet may be determined on the basis of a difference between images and the remaining amount of the roll sheet by arranging the images in various patterns (horizontally and vertically).

In step S504, the printable roll width decided upon as described above is registered (stored in the RAM 204) as a printable roll width of the received print job in the print-waiting job list. When a plurality of the printable roll widths have been registered in the manner described above, priority levels may be assigned to them. A higher priority level is assigned to a printable roll width closer to the roll width set in the image forming apparatus 200.

When the processing described above has been finished, the flow proceeds to step S402. However, since subsequent print jobs are received in succession, the processing of FIG. 5 is repeated in parallel for each job, whenever a print job is received.

In step S402, the received print job is processed by the image processing unit 207 so as to have a form for which the engine control unit 209 performs printing processing.

Figure 6:
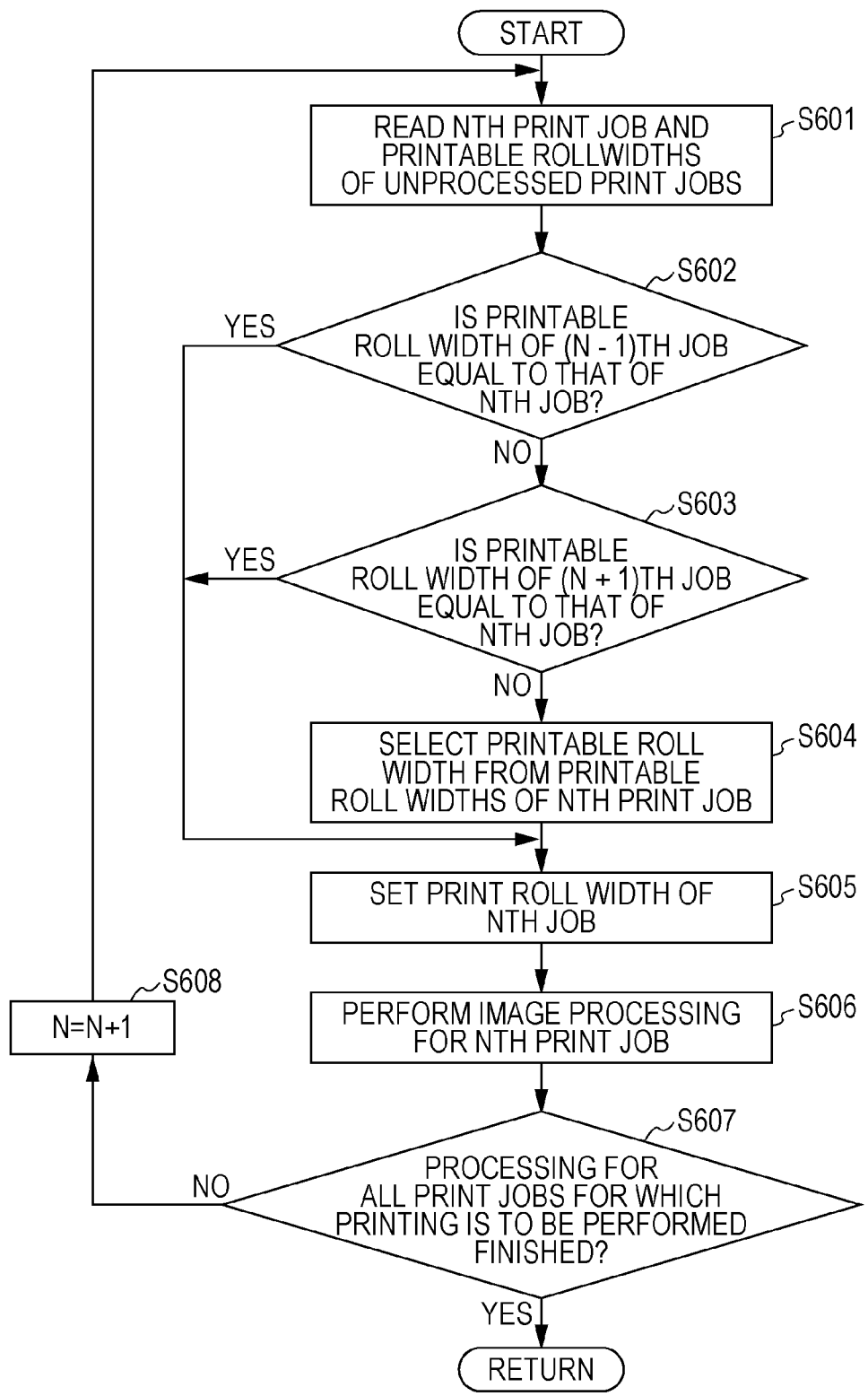
FIG. 6 is a flowchart illustrating a flow of image processing for a print job according to an exemplary embodiment of the present invention.

FIG. 6 is a flowchart illustrating the detailed processing of step S402. This flowchart illustrates the flow of processing that the CPU of the image processing unit 207 performs by loading control programs stored in the ROM of the image processing unit 207 or the HDD 206 into the RAM of the image processing unit 207 and executing the programs.

In step S601, the Nth print job in the print-waiting job list is read from the HDD 206 and written into the RAM of the image processing unit 207. Then, the printable roll widths of unprocessed print jobs stored in the HDD 206 are read from the print-waiting job list stored in the RAM 204 and written into the RAM of the image processing unit 207. "N" is a variable which is changed in accordance with a print job to be processed. Here, assuming that a print job is received for the first time in a state in which there have been no unprocessed print jobs, the first job is taken out.

In step S602, it is determined whether or not the print roll width of the prior ((N−1)th) print job is included in the printable roll widths of the Nth print job. Here, the (N−1)th print job may be a job for which printing processing is already being performed. Regarding the (N−1)th print job, it has already been decided which one among the printable roll widths is to be used as the width of a sheet, i.e., the print roll width. When the determination result of step S602 is affirmative, the flow proceeds to step S605, and when the determination result of step S602 is negative, the flow proceeds to step S603. The flow proceeds to step S603 also when there does not exist the (N−1)th print job.

In step S603, by comparing the printable roll widths of the next ((N+1)th) print job with those of the Nth print job, it is determined whether or not the same printable roll width is included in them. When a plurality of the same ones are included in them, one of them is selected in accordance with priority levels. The priority levels in descending order are as follows: (1) the width of the roll sheet currently set in the cassette 101*a* or 101*b*, (2) the width equal to that of the print sheet size of the Nth print job, (3) the width allowing a margin to be minimized. A sheet that meets the condition of a high priority level is preferentially selected as a sheet to be used. Regarding (1), one of the cassettes 101*a* and 101*b* which has already been selected for print processing may be made to have a higher priority level. Regarding (2), when the printable roll widths include a width larger than that of the output sheet and a width equal to that of the output sheet, the width equal to that of the output sheet is preferentially selected. Regarding (3), this is taken into consideration when there are a plurality of widths larger than the width of the output sheet. Here, when the determination result of step S603 is affirmative, the flow proceeds to step S605, and when the determination result is negative, the flow proceeds to step S604. The flow proceeds to step S604 also when the (N+1)th print job does not exist.

In step S604, one of the printable roll widths of the Nth print job is selected. When there is a single printable roll width, this one is selected, and when there is more than one, one of them is selected in accordance with priority levels. The priority levels are similar to (1) to (3) described above.

In step S605, it is decided that the printable roll width selected in one of steps S602 to S604 is made to be the printable roll width of the Nth print job, and is set (stored) in the RAM of the image processing unit 207.

Then in step S606, image processing for the Nth job is performed in accordance with the printable roll width which has been set in step S605. Specifically, the print data is converted to data (developed into image data) having a form that allows printing processing to be performed. At this time, the length and width of the output sheet may change places, depending on the print roll width which has been set. In this case, processing for rotating an image by 90 or 270 degrees is also performed. In addition, when the set roll width is larger than the width of the output sheet, processing for adding margins is also performed. In the processing for adding margins, white image data may be added or the starting position of the image may be controlled so as to make margins be provided. Further, when the margins are added, marks or lines indicating cutting positions are also added. At this time, the image is not reduced or enlarged, and is printed as an image having the (original) size specified by the print job.

The processing described above is repeated, while 1 is added to N in step S608, until it is determined in step S607 that the processing described above has been performed for all the print jobs for which printing is to be performed.

FIG. 3B illustrates an example in which a print roll width has been decided upon in the case in which it has been set that printing is "not permitted" on a sheet having a width larger than that of an output sheet. The printable roll width is limited to the long side length or short side length of the output sheet among the roll widths which are supported by the image forming apparatus 200. In the first print job, since the printable roll widths of a subsequent print job does not include "12 inches", and since a roll sheet with a width of 12 inches has been set in the cassette 101a or 101b, the print roll width has been set to be "12 inches". In the second print job, since the printable roll widths of a subsequent print job includes "6 inches", the printable roll width has been set to be "6 inches" among "6 inches" and "8 inches". Further, in step S606, processing for rotating the images of the first and third print jobs by 90 or 270 degrees is performed.

FIG. 3C illustrates an example in which a print roll width has been decided upon in the case in which it is set that printing is "permitted" on a sheet having a width larger than that of an output sheet. The printable roll width is equal to or larger than the width of the output sheet among the roll widths which are supported by the image forming apparatus 200. By comparing the printable roll widths of prior and subsequent print jobs, the print roll widths have been set to be "12 inches", which is common among the print jobs. Here, since the second and third jobs specify bookbinding, printable roll widths larger than the widths of the output sheets have been added. In step S606, 90 or 270 degree image rotation processing is performed for the first print job. For the second and third print jobs, rotation processing may or may not be performed in accordance with the number of pages. Further, for the second and third print jobs, since printing is performed on a sheet with a width larger than those of the output sheets, margin data and cutting lines corresponding to the positions of the output sheets are added.

In the second (N=2) processing or later, since the print roll width of the immediately prior print job has been decided upon in the prior processing, in steps S602 and S603, it is determined whether or not a print roll width equal to that of the immediately prior print job is included.

In some cases, the processing described above is not repeated until processing for all the jobs on the print-waiting job list has been finished. In the case in which a job that specifies duplex printing is included, when image data (data supplied to the engine control unit 209) of a predetermined length has been generated, with a sheet length as a reference, control exits the flow for a time. After exiting the flow, by initializing the value of N (making N=1), processing regarding unprocessed print jobs is started from step S601. This is to prevent discharging of sheets of the first print job from being delayed, because, in duplex printing, a plurality of images are continuously printed on the first surface before printing on the other surface, and a sheet is not cut image by image at the time of printing on the first surface.

In the processing described above, although the print roll width for the Nth job is decided upon by referring to only the immediately prior print job and immediately subsequent print job, print jobs two or more apart from the present print job may be further referred to.

Further, in the processing described above, when a print job has print data corresponding to not only one sheet but a plurality of pages in terms of output sheets, processing similar to the above-described processing is performed for images (pages) neighboring one another on the same surface of a sheet. In addition, although the examples in which the sheet sizes of respective print jobs are compared have been described, the types of sheet are also compared, whereby printing is performed such that the same type of sheet continues.

After exiting the flow illustrated in FIG. 6, control proceeds to step S403, where the image data generated by the processing illustrated in FIG. 6 is supplied to the engine control unit 209 and printing processing is performed.

Figure 7:
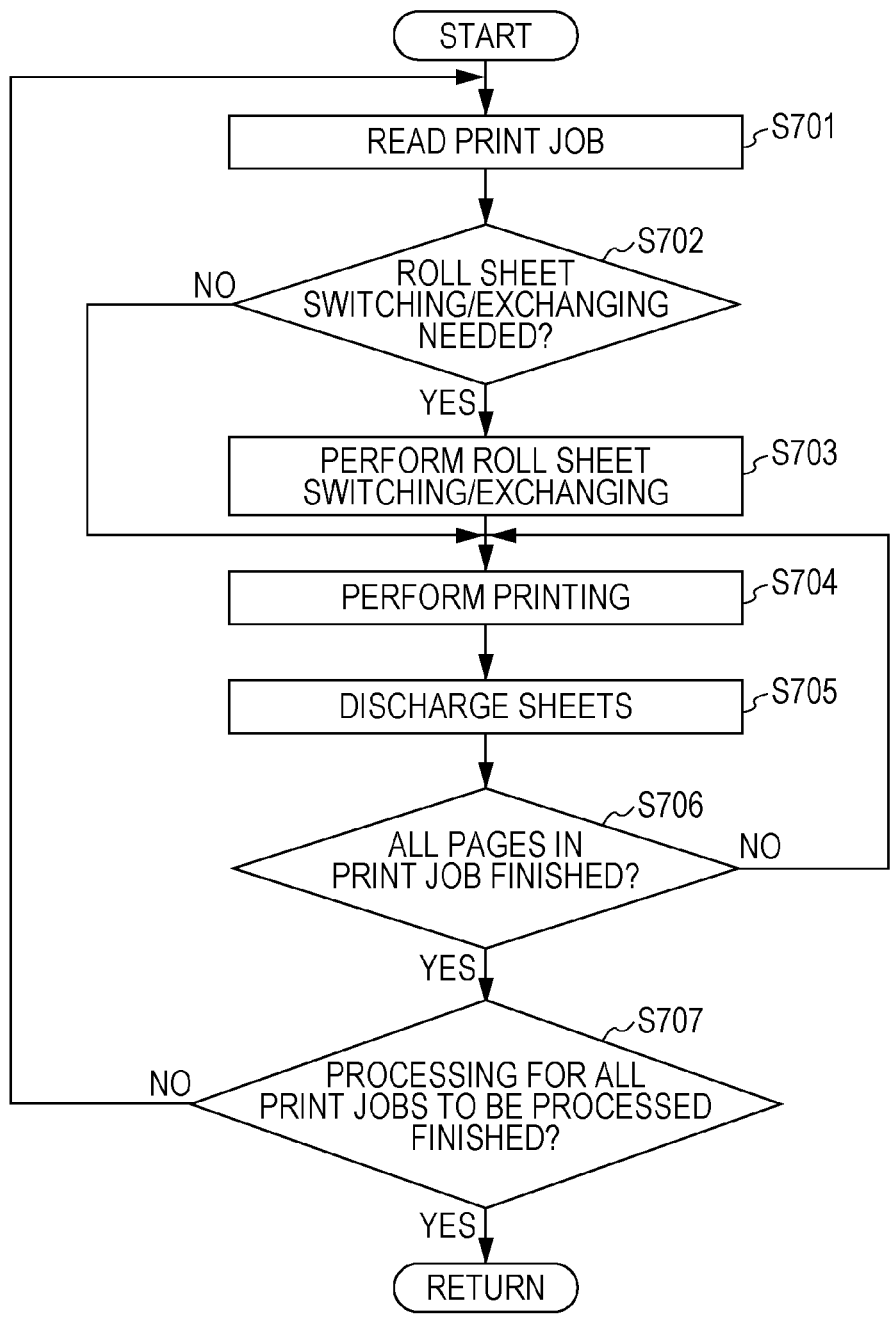
FIG. 7 is a flowchart illustrating a flow of printing processing for a print job according to an exemplary embodiment of the present invention.

FIG. 7 is a flowchart illustrating the details of the processing of step S403. This flowchart illustrates the flow of processing that the CPU of the engine control unit 209 performs by loading control programs stored in the ROM of the engine control unit 209 or the HDD 206 into the RAM of the engine control unit 209 and executing the programs.

In step S701, a print job (image data) which has been converted to a form for which printing is possible is read from the RAM of the image processing unit 207 and written into the RAM of the engine control unit 209. In step S702, by comparing the print roll width of this print job with that of the immediately prior print job or that of an already selected sheet cassette, it is determined whether or not roll sheet switching or exchanging is necessary. Here, when the compared widths are different from each other, it is determined that roll sheet switching or exchanging is necessary. Even when the compared widths are the same, it is determined that roll sheet switching or exchanging is necessary when the remaining amount of the roll sheet is insufficient. When it is determined that roll sheet switching or exchanging is necessary, the flow proceeds to step S703, and when it is determined that roll sheet switching or exchanging is not necessary, the flow proceeds to step S704.

In step S703, when the roll sheet to be used for the present print job has been set in one of the cassettes 101a and 101b which has not been selected, the cassette supplying a roll sheet is switched to the other one. When the roll sheet to be used for the present print job has not been set in the cassette 101a or 101b, a user needs to exchange the current roll sheet for another one or newly set another one. Hence, a message prompting roll sheet switching or exchanging, together with the size of a roll sheet (roll width), is displayed on the display of the operation unit 115. The host apparatus 215 may be similarly notified of the message prompting roll sheet switching or exchanging together with the roll width. When roll sheet setting for the cassette 101a or 101b has been performed by a user in accordance with the message or notification, the flow proceeds to step S704.

When it has been determined in step S702 that roll sheet switching or exchanging is not necessary or when roll sheet switching or exchanging has been performed in step S703, printing for the print job to be processed is performed in step S704. Specifically, the engine control unit 209 makes a sheet be supplied from the cassette 101a or 101b in accordance with the size of an image to be printed and a type of sheet to be used. The engine control unit 209 makes the conveyer unit 102 convey the sheet to the printing position of the head unit 105, performs printing of images based on the image data on the first surface of the sheet successively, and makes the sheet be conveyed to the reading position of the scanner unit 107. It is determined whether or not the images are correctly printed on the basis of the content of the image data obtained through reading of the printed images by the scanner unit 107, and the sheet is conveyed to the cutter unit 110. When duplex printing jobs are included, the sheet is not cut in units of pages by the cutter unit 110, and the sheet, in the form of a continuous sheet, is made to pass through the dryer unit 112, where it is subjected to an ink drying process. Then the sheet is made to be wound by the sheet winding unit 113. When printing of all the images to be arranged on the first surface is finished, the sheet is cut by the cutter unit 110, printing is similarly performed for images to be arranged on the opposite surface of the sheet, which has been reversed and conveyed again from the sheet winding unit 113. At the time of printing images on the opposite surface, the sheet is cut in units of pages by the cutter unit 110. Note that when duplex printing jobs are included, after printing on only the first surface has been finished for one print job, printing on the first surface for the subsequent print job is performed, and then printing on the opposite surface is performed. On the other hand, in the case of simplex printing, after the printing on the first surface has been finished, the sheet is cut in units of pages by the cutter unit 110, without being wound by the sheet winding unit 113.

In step S705, printed sheets cut in units of pages (in units of output sheets) by the cutter unit 110 are sequentially discharged to specified trays of the sorting unit 114.

In step S706, printing and discharging of sheets are repeated until it is determined that printing of all the pages in a print job to be printed has been finished, and when printing and discharging of pages to be printed has been finished, the flow proceeds to step S707. In step S707, it is determined whether or not there remains a print job yet to be processed, and when it is determined that there remains a print job yet to be processed, the flow goes back to step S701, where processing for the next print job is performed.

Note that in the printing processing described above, when printing is continued on the same sheet, the sheet is not rewound to the cassette 101*a* or 101*b* or drawn out again.

As described above, according to the present embodiment, even when print jobs that include printing with different sizes and orientations continue, printing is performed on the same sheet, which realizes efficient processing of a plurality of print jobs. In addition, regarding sheet supplying cassettes, an already selected cassette is preferentially used. In other words, the frequency of roll sheet switching or exchanging can be decreased. At this time, printing on a sheet with a width larger than that of the output sheet is permitted or not in accordance with print modes, and is permitted for the case in which cutting processing is performed by a bookbinding apparatus later, whereby work efficiency is maintained. Further, since print jobs are executed in the order in which they have been received, the print jobs can be easily managed to make a plurality of functional blocks share the processing. In other words, print jobs can be executed without complex processing for switching between the print jobs.

As described above, it is efficient to continuously perform printing for a plurality of print jobs. On the other hand, when the image forming apparatus 200 automatically determines sheets to be used in print jobs or the order in which printing is performed in accordance with predetermined rules, a result not expected by a user may arise. For example, a user may have various kinds of requirements, such as continuously performing as many print jobs as possible and using a specific sheet first. Hence, examples of deciding how print jobs are to be executed in accordance with instructions from a user are described below.

FIG. 8A illustrates an exemplary selection screen for allowing a user to select how a plurality of print jobs are to be executed. This inquiry screen is displayed on the display of the operation unit 115 or the host apparatus 215 in a state in which the image forming apparatus 200 has accepted a plurality of print jobs and is waiting for the execution of the print jobs. The message in this screen allows a user to select whether the method of executing the print jobs is to be automatically decided upon in accordance with the rules set in advance in the image forming apparatus 200 or to be decided upon by the user. The method of executing the print jobs includes a method of deciding upon the sheet to be used.

When "Yes" is selected in the screen illustrated in FIG. 8A, a plurality of print jobs are executed in accordance with the predetermined rules by the image forming apparatus 200, as described above with reference to FIGS. 4 to 7. In other words, the plurality of jobs are continuously executed using the same sheet as far as possible, including the case in which a sheet with a width larger than that of the output sheet. On the other hand, when "No" is selected, a user is made to specify the following points in the determination of the method of executing the jobs.

When "No" is selected in the screen illustrated in FIG. 8A and an instruction to display a selection screen for selecting recommended candidates is given, the screen is switched to the screen illustrated in FIG. 8B, where the user is made to select the priority of a sheet to be used. Here, a sheet corresponding to the pattern specified by the user among the presented sheets, is preferentially used. In the screen illustrated in FIG. 8B, since the printable roll widths (and sheet type) of the upper print jobs (print jobs to be executed earlier) of a group of jobs (FIG. 9A) currently waiting for printing are "6 inches (A)" and "8 inches (A)", these two are displayed as recommended candidates. Note that FIG. 9A is similar to FIG. 3A. FIG. 9A can be displayed on the display of the operation unit 115 or the host apparatus 215 in accordance with an instruction or the like from the user. Referring to FIG. 9A, if a "6-inch (A)" sheet is used, the print jobs Nos. 1 to 3, 5, 7, and 8 in the group of print jobs currently waiting for printing can be continuously and hence efficiently executed. On the other hand, when "8-inch (A)" is specified due to reasons such as "An 8-inch (A) sheet has already been drawn out", "The amount of sheet to be conveyed is preferably as small as possible", and "Print jobs that use an 8-inch (A) sheet are preferably finished first", the print jobs Nos. 2, 6, and 8 are continuously executed. Note that the above-described two patterns illustrate the upper two patterns, in the group of print-waiting print jobs, which allow more print jobs to be continuously executed. However, three or more of the recommended patterns may be listed, or, by showing only one pattern, the user may be asked whether or not the pattern is to be used for the execution of print jobs. Further, only the patterns corresponding to the sheets currently set in the cassettes of the image forming apparatus 200 may be displayed.

When "pattern 1" is selected in the screen illustrated in FIG. 8B, the screen illustrated in FIG. 9B, which allows print jobs that can use the roll width "6 inches" and uses the sheet type "A" to be identified, is displayed on the display of the operation unit 115 or the host apparatus 215. The screen illustrated in FIG. 9B also displays information about which of the width and length of the output sheet is selected as the print roll width. By looking at this screen, the user can give an instruction to remove a specific print job from the group of print jobs to be continuously executed. In addition, since the screen illustrated in FIG. 9B displays calculated (estimated)

printing time for each print job, the user can refer to this information for the selection of the method of executing the print job.

When "Pattern 2" is selected in the screen illustrated in FIG. 8B or when an instruction to display the next pattern is given in the screen illustrated in FIG. 9B, the screen illustrated in FIG. 9C is displayed on the display of the operation unit 115 or the host apparatus 215. The screen illustrated in FIG. 9C displays information similar to that of the screen illustrated in FIG. 9B, but by identifying appropriate print jobs using symbols different from those in FIG. 9B, it is made clear that the screen illustrated in FIG. 9C displays a pattern different from that displayed by the screen illustrated in FIG. 9B. Note that the print jobs Nos. 2 and 8 in the group of print-waiting print jobs are common for both "Pattern 1" and "Pattern 2". In addition, FIG. 9B and FIG. 9C may display respective information on the same job list. Also in this case, since different symbols (○,Δ) are used for respective patterns, they are easily identified. Various symbols other than those used in FIGS. 9B and 9C may be used.

When printing is instructed (via the screen illustrated in FIG. 8B, 9B, or 9C, in some cases) after "No" has been selected in the screen illustrated in FIG. 8A, the screen illustrated in FIG. 8C is displayed on the display of the operation unit 115 or the host apparatus 215.

When "Pattern 1" is selected in FIG. 8C, printing is started in order of priority (in order of reception) for print jobs corresponding to pattern 1. Here, printing is performed for the print jobs specified, in the screen illustrated in FIG. 9B, as print jobs to be continuously printed. When "Pattern 2" is selected, similar operations are performed. In the case in which a pattern has already been selected in FIG. 8B, for example, printing may be performed without pattern selection in FIG. 8C.

Figure 10:
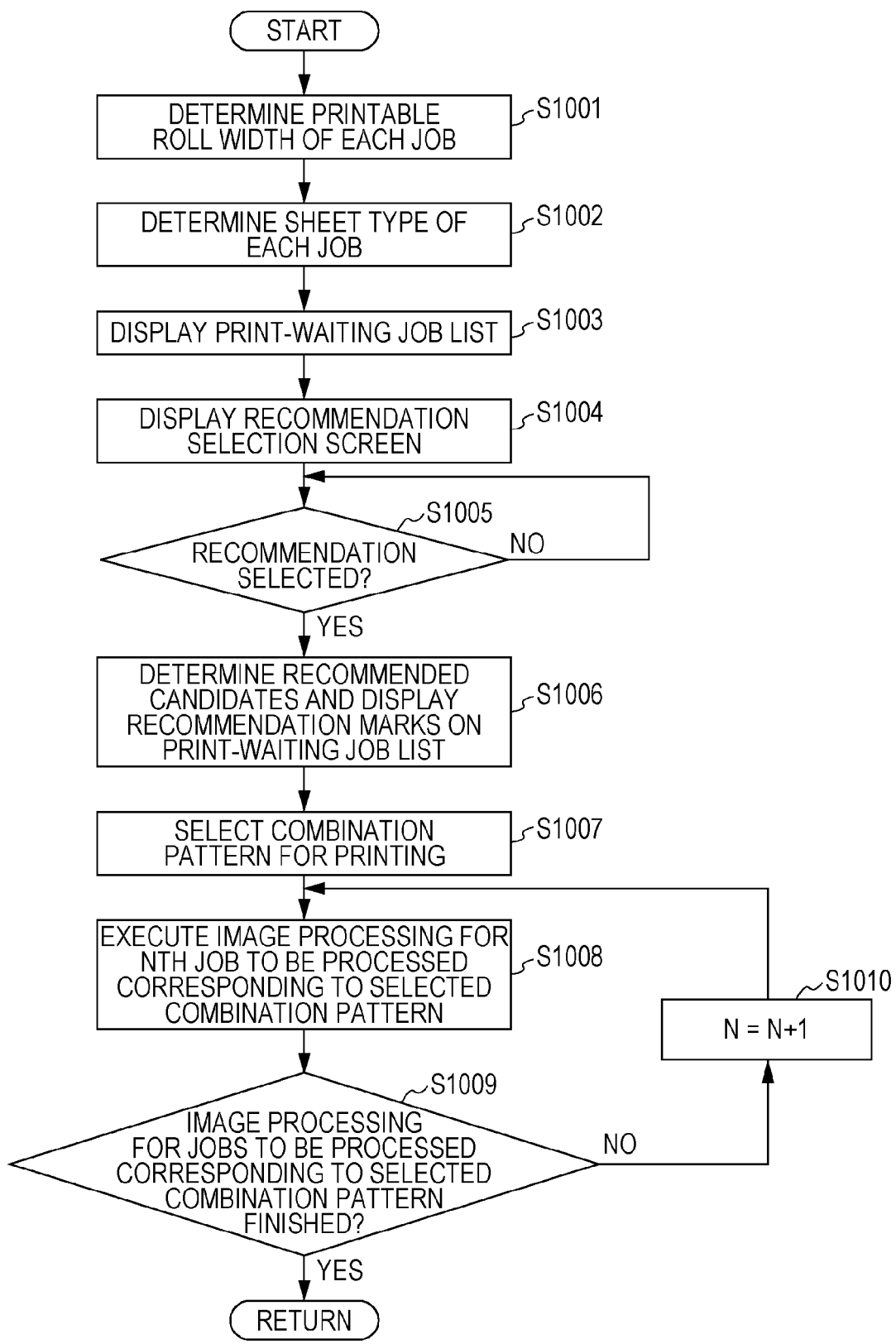
FIG. 10 is a flowchart illustrating a flow of processing for executing print jobs in accordance with a pattern specified by a user according to an exemplary embodiment of the present invention.

Next, description is made of the flow of processing which is performed when "No" is selected in FIG. 8A and the above-described recommended patterns for continuously printing a plurality of print jobs are decided upon, whereby printing is performed. FIG. 10 is a flowchart illustrating the flow of processing in this case. This flowchart illustrates the flow of processing that the CPU of the engine control unit 209 performs by loading control programs stored in the ROM of the image processing unit 207 or the HDD 206 in the RAM of the image processing unit 207 and executing the programs.

When "No" is selected in FIG. 8A and a plurality of print jobs have been input through the processing of step S401 illustrated in FIG. 4, the printable roll widths of the print jobs listed in the print-waiting job list are determined, in step S1001 illustrated in FIG. 10. Note that the jobs listed in the print-waiting job list may be a group of print jobs which have been input within a given period of time, or may be a group of print jobs, having a predetermined upper limit, which have waited a predetermined period of time for being input. Then, in step S1002, the sheet type of a sheet used by each of the group of the print jobs is determined.

In step S1003, when displaying of the print-waiting job list is instructed through the operation unit 115, the print-waiting job list illustrated in FIG. 9A based on the information determined in steps S1001 and S1002 is displayed on the display of the operation unit 115. Note that this processing of step S1003 may be skipped.

In step S1004, when displaying of recommended candidates is instructed through the operation unit 115, the recommended pattern selection screen illustrated in FIG. 8A is displayed on the display of the operation unit 115. When it is determined in step S1005 that one of the recommended patterns displayed in this screen has been selected, the flow proceeds to step S1006, where the job list, illustrated in FIG. 9B or 9C, which allows the selected recommended pattern to be identified is displayed on the display of the operation unit 115.

In step S1007, when printing is instructed through the operation unit 115, the screen illustrated in FIG. 8C is displayed, and when one of the recommended patterns is selected through the screen or when execution or printing is instructed through the screen illustrated in FIG. 9B or 9C, the flow proceeds to step S1008.

In step S1008, image processing for the Nth (N=1) print job corresponding to the selected recommended pattern is performed, and the processing is repeated by incrementing N by 1 in step S1010 until it is determined in step S1009 that image processing for all the print jobs for which printing is to be performed is finished. Note that all the print jobs for which printing is to be performed are processed in sequence such that print jobs corresponding to pattern 1 is first processed and then unprocessed print jobs corresponding to pattern 2 are processed in sequence. The print jobs for which image processing has been finished are subjected to the print processing of step S403 illustrated in FIG. 4.

Note that in the case in which one of the plurality of recommend patterns is selected by a user, as in FIGS. 8B and 8C, the user may be provided with various kinds of information, thereby allowing the user to select a pattern which is closer to the intention of the user.

FIG. 11A illustrates, for each recommended pattern, the number of print jobs for which printing can be continuously performed and the time which is required to finish printing of all the print jobs when the recommended pattern has been selected (including print jobs corresponding to other patterns). This is displayed on the display of the operation unit 115 or the host apparatus 215 in response to an instruction from the operation unit 115 or the host apparatus 215. In this case, it is assumed that more than three cassettes for holding sheets are provided in the image forming apparatus 200, and a type A sheet having a roll width of 6 inches, a type A sheet having a roll width of 8 inches, and a type B sheet having a roll width of 6 inches are set in the respective cassettes of the image forming apparatus 200.

In FIG. 11A, pattern 1 illustrates the case in which printing using a type A sheet having a width of 6 inches is performed first, and patterns 2 and 3 illustrate the cases in which printing using a type A sheet having a width of 8 inches and printing using a type B sheet having a width of 6 inches are respectively performed first.

The recommendation (number of jobs) shows the number of print jobs continuously executed first for each pattern. In other words, the screen illustrated in FIG. 11a shows that six print jobs using a type A sheet having a width of 6 inches continue in pattern 1, three print jobs using a type A sheet having a width of 8 inches continue in pattern 2, and one print job using a type B sheet having a width of 6 inches is executed. Here, recommendation levels are determined on the basis of the numbers of jobs, and a numeral in front of the number of jobs represents a recommendation level assigned in accordance with descending order of the number of continuously executed jobs. A user can select a pattern on the basis of the number of continuously executed jobs, by referring to the recommendation (number of jobs).

In FIG. 11A, recommendation (time) shows a total time needed to execute all the print jobs, for which printing is to be performed, for each pattern which has been selected. Referring to FIG. 11B, the total time for each pattern is the sum of printing times spent for printing on respective sheets when print jobs are executed in sequence in accordance with the pattern. Note that the total time includes the time required to switch the sheet. In FIG. 11A, a numeral in front of the total time represents a recommendation level assigned in accordance with ascending order of the total time. A user can select a pattern on the basis of the total time, by referring to the recommendation (total time).

As described above, a user can start printing processing after selecting desired options, by checking with a display screen the selection of print jobs to be subjected to continuous printing processing on the same sheet and the order in which printing is to be performed. At this time, the user need only select one of the plurality of prepared patterns for executing print jobs presented by the image forming apparatus 200, resulting in increased operability.

Further, there may be a case in which a user does not want a plurality of print jobs to be continuously executed, for example, because the user wants to reduce the possibility of running out of the sheet during the execution of a job, or the user wants to prevent printing, on the second surface, of prior jobs from being delayed owing to an error in a subsequent job, in the case of duplex printing. To deal with such cases, a capability may be provided which allows a user to specify the prohibition of continuous printing for a plurality of print jobs or specify restriction on the number of jobs to be continuously processed. This may be realized by specifying through the operation unit 115 when the screen illustrated in FIG. 8A is displayed, or may be set in the image forming apparatus 200 in advance.

In the above description, by realizing processing except for printing, such as decision on printable roll widths and print roll widths, rotation, and addition of margins, using an external apparatus such as a host apparatus or an external controller, the image forming apparatus may be made to perform printing in accordance with the external apparatus. In this case, the external apparatus can obtain status information (current printing status, information about sheet cassettes, etc.) from the image forming apparatus, and thereby perform the above-described processing. The external apparatus can specify how print jobs are to be continuously performed, and in what order printing is to be performed. In this case, the external apparatus functions as a print control apparatus.

The present invention is also realized by performing the following processing. That is, the present invention is realized by providing a system or an apparatus with software (programs) that realizes the functions of the above-described embodiments, by means of a network or various storage media, and as a result of the computer (or a processor, such as a CPU, an MPU, and/or the like) of the system or the apparatus reading and executing the programs. The programs may be executed by a single computer or a plurality of computers cooperating with one another. In addition, it is not necessary that the above-described processing is realized using only software, and part or the whole of the processing may be realized using hardware.

The present invention is not limited to the above-described embodiments, and various modifications (including application to other embodiments and combination with other embodiments) are possible.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An apparatus comprising:
a determination unit configured to determine an output sheet size specified by a first print job and an output sheet size specified by a second print job;
a decision unit configured to decide on a sheet width of a continuous sheet to be used by the first print job and the second print job based on each of the determined output sheet size specified by the first print job and the determined output sheet size specified by the second print job; and
a control unit configured to cause a printing unit to print an image based on the first print job and an image based on the second print job continuously on a continuous sheet having the sheet width decided on by the decision unit.

2. The apparatus according to claim 1,
wherein the determination unit determines a long side length and a short side length specified by the first print job and a long side length and a short side length specified by the second print job;
wherein the decision unit decides on the sheet width of the continuous sheet to be used based on each of the determined long side length and short side length of the first print job and the determined long side length and short side length of the second print job; and
wherein the control unit is able to rotate, in accordance with the sheet width decided on by the decision unit, at least one image based on the first print job and the image based on the second print job.

3. The apparatus according to claim 2,
wherein, in a case where the long side length of the first print job is equal to the short side length of the second print job or in a case where the short side length of the first print job is equal to the long side length of the second print job, the decision unit is able to decide an equal sheet width as the sheet width of the continuous sheet to be used, and the control unit causes the printing unit to print the image based on the first print job and the image based on the second print job onto the continuous sheet having the sheet width decided on by the decision unit by rotating at least one of the image based on the first print job and the image based on the second print job.

4. The apparatus according to claim 1, wherein, in a case where a sheet width equal to the output sheet size determined by the determination unit and a sheet width larger than the output sheet size determined by the determination unit are able to be used for the first print job and the second print job, the decision unit decides on the sheet width of the continuous sheet to be used by giving priority to the sheet width equal to the output sheet size determined by the determination unit.

5. The apparatus according to claim 1, wherein the decision unit is able to decide, as the sheet width of the continuous sheet to be used, the sheet size having the sheet width larger than at least one of the output sheet size of the first print job and the output sheet size of the second print job.

6. The apparatus according to claim 1, wherein, in a case where at least one of sheet sizes of a continuous sheet which is able to be supplied to the printing unit is larger than the output sheet size determined by the determination unit, the decision unit regards the output sheet size determined by the determination unit and the at least one of sheet sizes which is able to be supplied to the printing unit and is larger than the output sheet size determined by the determination unit as a sheet size being able to be used and decides on the sheet width of the continuous sheet to be used.

7. The apparatus according to claim 1, wherein, in a case where the sheet width decided by the decision unit is larger than at least one of the determined output sheet size specified by the first print job and the determined output sheet size specified by the second print job, the control unit controls the printing unit to perform the continuous printing after performing processing of adding a margin to the image based on the first print job or to the image based on the second print job.

8. The apparatus according to claim 1, wherein, in a case where a plurality of sheet widths is able to be decided as the sheet width being able to be used for the first print job and as the sheet width being able to be used for the second print job, the decision unit decides on the sheet width of the continuous sheet to be used by giving priority to a sheet size of a continuous sheet set to a sheet supplying unit.

9. The apparatus according to claim 1, wherein the control unit causes the printing unit to execute each of print jobs in order of reception.

10. The apparatus according to claim 1, further comprising a presentation unit configured to present, based on the sheet sizes determined by the determination unit, a method of executing print jobs for which printing using a same continuous sheet is allowed to be performed, wherein the control unit performs control such that images based on a plurality of the print jobs are continuously printed by the printing unit on the same continuous sheet supplied to the printing unit, in accordance with an instruction of a user based on the presentation made by the presentation unit.

11. The apparatus according to claim 10, wherein the presentation unit presents a plurality of patterns as methods of executing the plurality of the print jobs, and the print control unit performs control such that printing is performed by the printing unit in accordance with a pattern specified by a user.

12. The apparatus according to claim 10, wherein the presentation unit presents the plurality of the patterns corresponding to different orders in which printing is performed.

13. The apparatus according to claim 10, wherein the presentation unit presents the plurality of the patterns corresponding to different continuous sheets to be preferentially used.

14. The apparatus according to claim 10, wherein the presentation unit presents the plurality of the patterns corresponding to different times used to execute the plurality of the print jobs.

* * * * *